Aug. 19, 1924.  
G. F. KOLB ET AL  
AUTOMOBILE BUMPER BRACKET  
Filed Aug. 31, 1923  
1,505,900  
2 Sheets-Sheet 1
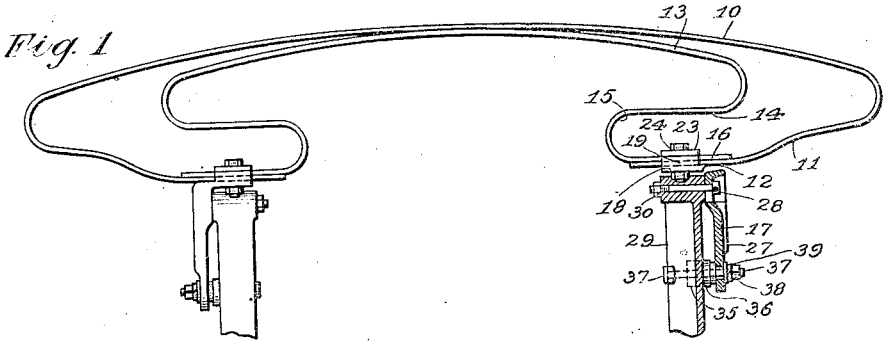
Fig. 1
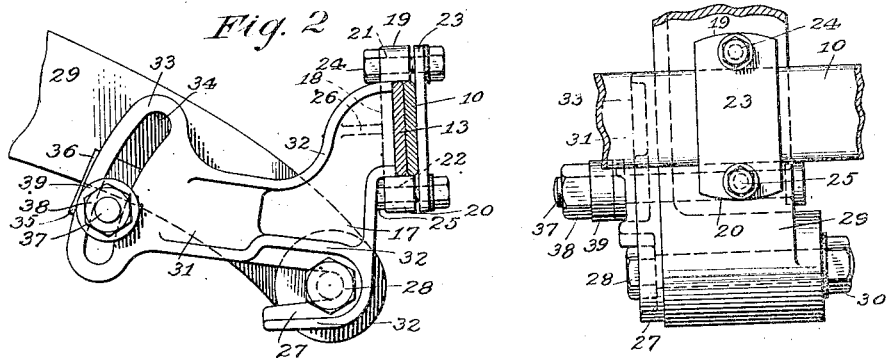
Fig. 2  
Fig. 3
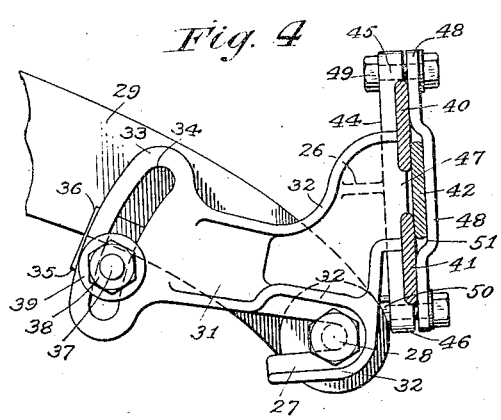
Fig. 4
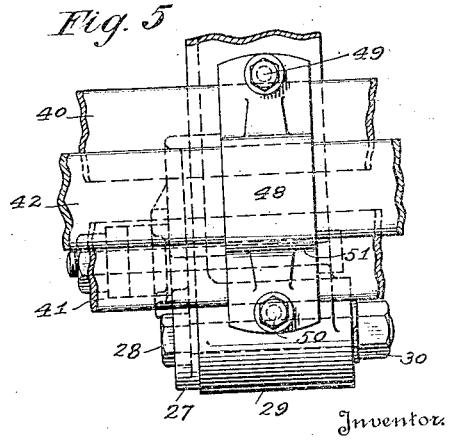
Fig. 5
Inventor  
George F. Kolb and  
John H. Lucas  
By  
Chamberlain & Newman Attorneys Aug. 19, 1924.  1,505,900
G. F. KOLB ET AL
AUTOMOBILE BUMPER BRACKET
Filed Aug. 31, 1923    2 Sheets-Sheet 2
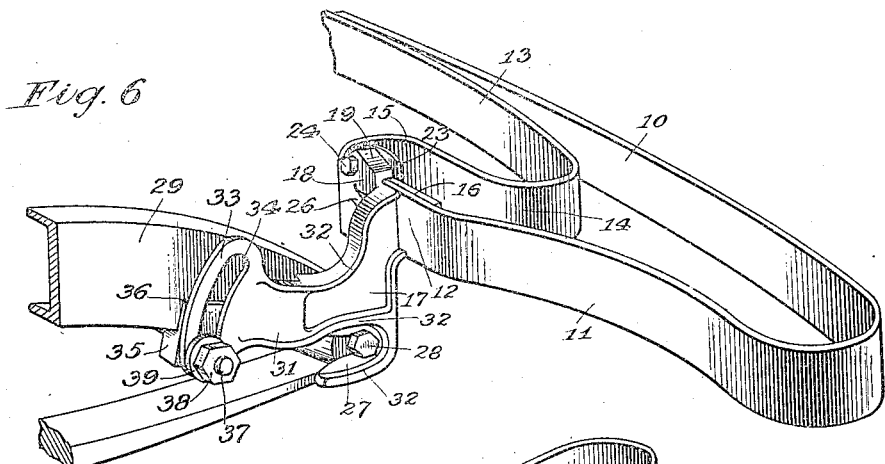
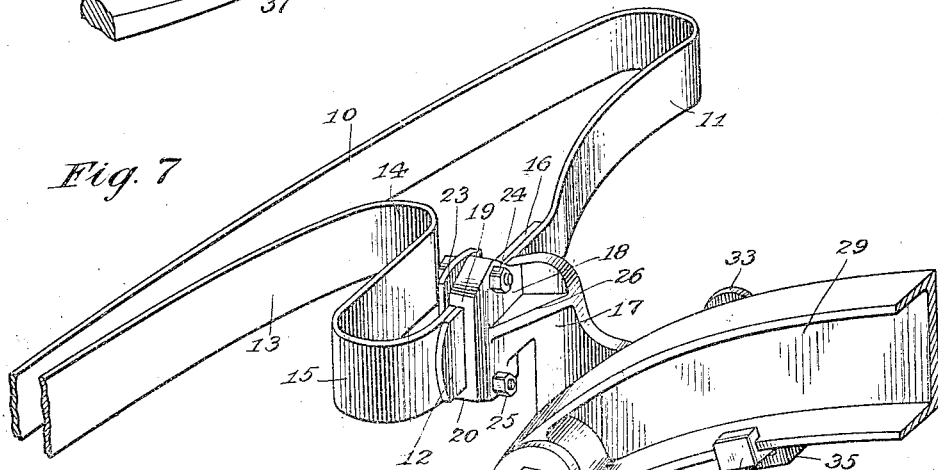
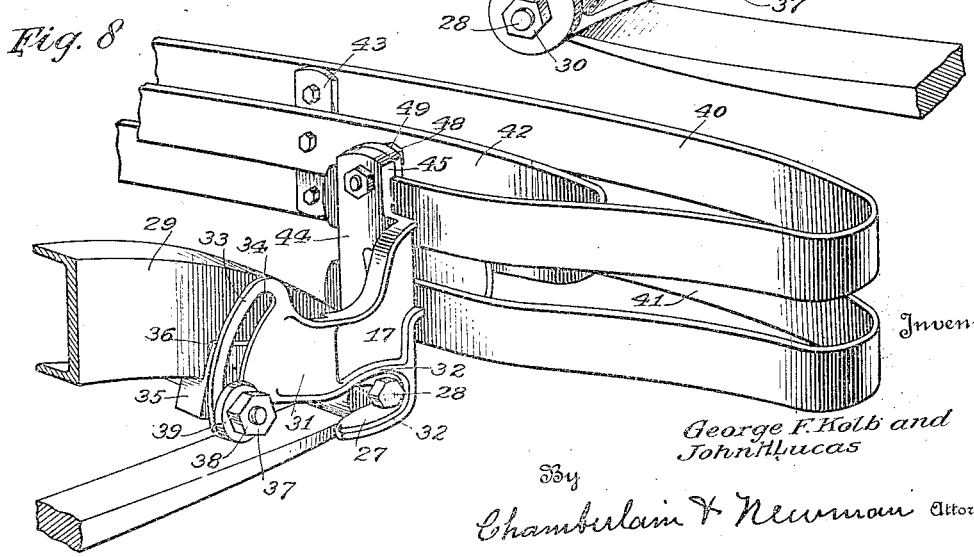
Inventors
George F. Kolb and
John H. Lucas
By
Chamberlain & Newman Attorneys Patented Aug. 19, 1924.

1,505,900

UNITED STATES PATENT OFFICE.

GEORGE F. KOLB, OF FAIRFIELD, AND JOHN H. LUCAS, OF BRIDGEPORT, CONNECTICUT, ASSIGNORS TO THE BULLARD MACHINE TOOL CO., OF BRIDGEPORT, CONNECTICUT, A CORPORATION OF CONNECTICUT.

AUTOMOBILE BUMPER BRACKET.

Application filed August 31, 1923. Serial No. 660,264.

*To all whom it may concern:*

Be it known that we, GEORGE F. KOLB and JOHN H. LUCAS, citizens of the United States, and residents of Fairfield and Bridgeport, respectively, in the county of Fairfield and State of Connecticut, have invented certain new and useful Improvements in Automobile Bumper Brackets, of which the following is a specification.

This invention relates to spring bumpers for automobiles, and more particularly to a universal form of bracket adapted for attachment to different makes of cars, and likewise to several styles of bumpers, and has for its object to provide a bumper which may be secured to the forward end of the automobile frame with facility, and without the necessity of drilling, cutting out rivets or otherwise altering the automobile structure to permit the attachment of the bumper.

A further object is to provide a bumper which will be standard, in so far as it may be attached to various makes of automobiles, in which the frame and shackle bolts are of different dimensions, and to this end it is proposed to provide a novel form of attaching bracket.

A still further object is to provide for the adjustment of the bumper, so that it may be properly positioned with respect to the automobile and the road-bed. Still another object is to provide a type of bracket, which may be adapted to the provision of either single or double spring bar bumpers.

With the above and other objects in view, embodiments of the invention are shown in the accompanying drawings, and these embodiments will be hereinafter more fully described with reference thereto, and the invention will be finally pointed out in the claims.

In the drawings:

Fig. 1 is a plan view of a bumper, according to one embodiment of the invention, being attached to the forward end of the automobile frame;

Fig. 2 is a side elevation of the attaching bracket, at one side of the frame, and provided with a single bar bumper;

Fig. 3 is a front elevation thereof;

Fig. 4 is a side elevation of a modified form of attaching bracket, provided with a double spring bar bumper;

Fig. 5 is a front elevation thereof;

Fig. 6 is a perspective outer side and rear view of one end of the single spring bar bumper and attaching bracket;

Fig. 7 is a perspective inner side and rear view of the same, and

Fig. 8 is a perspective outer side and rear view of one end of the double spring bar bumper and attaching bracket.

Similar reference characters indicate corresponding parts throughout the several figures of the drawings.

Referring to the drawings, and more particularly to Figs. 1 to 3 and 6 and 7, the embodiment of the invention shown therein comprises a single convexly curved spring bar bumper 10, having its rear ends bent inwardly, as at 11, and provided with aligned straight attaching portions 12. A secondary reinforcing spring bar 13 engages the bar 10 at the rear side and has its end portions 14 bent into S-shape, as at 15, the terminals 16 being straight and aligned with and engaging the portion 12 in overlying relation. The portions 12 and 16 are adapted to be clamped to the attaching brackets, which in turn are attached to the forward ends of the automobile frame. Inasmuch as the attaching brackets at each side are identical in construction, only one will be described in detail.

The attaching bracket comprises a forward portion 17 provided at its upwardly projected forward portion with an inwardly extending and upwardly and downwardly projecting plate 18, upon which the end portion 12 of the spring bar is engaged, the plate being provided above and below the portion 12 with flanges 19 and 20, which serve to retain and position the portion 12, and are provided with threaded holes 21 and 22 for the engagement of clamping bolts. A clamping plate 23 engages the portion 16 of the spring bar at the forward side, and is secured at its upper and lower ends to the flanges 19 and 20 by means of bolts 24 and 25 engaging the holes 21 and 22, to thereby clamp the spring bars to the bracket. A laterally disposed reinforcing web 26 is formed integrally between the inner face of the portion 17 and the rear face of the portion 18.

At its lower end the portion 17 is provided with a rearwardly extending hook 27, the opening of which converges forwardly, and which is adapted to be engaged over the spring shackle bolt 28 at the forward end of the frame 29. In order to engage the hook, the nut 30 at the inner end of the bolt is loosened, and the bolt forced outwardly sufficiently to permit engagement with the bolt, the tapering of the hook permitting snug engagement with bolts of different diameters.

A rearwardly extending portion 31 is formed integrally with the portion 17, and is outwardly offset therefrom to space it from the frame. Reinforcing ribs or flanges 32 extend along the upper edge and outer side of the bracket, and also along the lower edge and outer side, being spaced from the opening of the hook to provide a recess in which the bolt head is seated.

The portion 31 terminates in an elongated arcuate portion 33, having an arcuate slot 34 therein, described substantially about the axis of the shackle bolt as a center.

The bracket is secured by means of a pressure lug having an apertured lower portion 35 engaged beneath the frame, and an upwardly extending flange 36 interposed between the outer side of the frame and the inner side of the arcuate portion 33, a hook-ended bolt 37, having its hook-end engaged over the inner lower edge of the channel frame, and extending at its opposed threaded end through the aperture of the lug and the arcuate slot 34, where it is secured by a nut 38 and a lock washer 39.

With the parts in this position, and the hook bolt still loose, the bracket is adjusted to bring the face of the spring bar bumper into a vertical plane with respect to the road-bed, the bracket being pivotal about the shackle bolt with the arcuate slot engaging the hook bolt. When properly adjusted the shackle and hook bolts are tightened to secure the bracket. With this construction the adjustment is brought about by means of the single hook bolt only, and the tapered hook and arcuate slot enable the bracket to be attached securely, irrespective of the diameter of the shackle bolt and the depth and curvature of the frame, so that the bracket may be said to be standard for practically all designs of automobiles.

In the modified form illustrated in Figs. 4 and 5 and 8, a double spring bar bumper is provided, and the bracket is adapted for its attachment. The bumper comprises a pair of similar upper and lower spring bars 40 and 41, and a single reinforcing bar 42, the three bars being bolted to a tie-plate 43, and the ends of the bars being arranged in superimposed and staggered relation.

The bracket is similar to the other form, with the exception of the spring bar clamping portion at the forward end. In this modified form, the clamping portion 44 is provided integrally at the forward end of the bracket, being uprightly disposed and relatively longer than the portion 18 of the first form. Upper and lower flanges 45 and 46 are provided at the upper and lower ends, which engage the upper and lower edges of the spring bars, while a central rib or flange 47 is formed upon the forward face to engage between the spaced bars and thereby retain and position them.

The clamping plate 48, which is secured at its upper and lower ends by bolts 49 and 50, is provided with a pressed out intermediate portion 51, which engages and positions the reinforcing bar 42 at its forward face, and also engages the forward faces of the bars 40 and 41 above and below the portion 51. It will be understood that the bar clamping portion of the bracket may be modified, as desired, to accommodate various types of bars.

We have illustrated and described preferred and satisfactory embodiments of the invention, but it will be obvious that changes may be made therein, within the spirit and scope thereof, as defined in the appended claims.

Having thus described our invention, what we claim and desire to secure by Letters Patent is:

1. An automobile bumper bracket adapted for attachment to shackle bolts in the frame ends of an automobile, and having means for supporting a bumper bar, and a pocket adapted for slidable and detachable engagement with shackle bolts of different sizes, and means for securing said bracket to said frame.

2. An automobile bumper bracket adapted for attachment to the frame ends of an automobile carrying shackle bolts having headed ends, including means for supporting a bumper bar and having an elongated pocket for adjustable engagement beneath the head of said shackle bolt, and means for securing said bracket to the frame and adapted to permit of angular adjustment of said bracket above the shackle bolt.

3. In an automobile bumper for use upon the shackle bolt carrying frame ends of an automobile, the shackle bolt having a head at its end a bumper bar, and an attaching bracket supporting said bar, and comprising a shackle bolt engaging portion adapted to engage shackle bolts of different diameters beneath their heads, and a portion extending rearwardly therefrom and provided with an arcuate slot substantially concentric to said shackle bolt engaging portion, a hook bolt adapted to engage the frame and extending at its threaded end through said slot, and a nut on said threaded end for securing said bolt and bracket, said slot permitting angular adjustmennt of said bracket about the shackle bolt, said hook bolt adapted upon tightening to secure the bracket in adjusted position.

4. In an automobile bumper for use upon the shackle bolt carrying frame ends of an automobile, a bumper bar, and an attaching bracket supporting said bar, and comprising a shackle bolt engaging portion, and a portion extending rearwardly therefrom and provided with an arcuate slot substantially concentric to said shackle bolt engaging portion, a hook bolt adapted to engage the frame and extending at its threaded end through said slot, a spacer block having a circular aperture engaged by said bolt and disposed between said bracket and frame and having a flat bracket engaging face, and a nut on said threaded end for securing said bolt and bracket, said slot permitting angular adjustment of said bracket about the shackle bolt, said hook bolt adapted upon tightening to secure the bracket in adjusted position.

5. In an automobile bumper for use upon the shackle bolt carrying frame ends of an automobile, a bumper bar, and an attaching bracket supporting said bar, and comprising a shackle bolt engaging portion adapted to snugly engage shackle bolts of different diameters, and means for securing said bracket to the frame.

6. In an automobile bumper for use upon the shackle bolt carrying frame ends of an automobile, a bumper bar, and an attaching bracket supporting said bar, and comprising a hook portion having a tapered opening adapted to snugly engage shackle bolts of different diameters, and means for securing said bracket to the frame.

7. In an automobile bumper for use upon the shackle bolt carrying frame of an automobile, a bumper bar, and an attaching bracket supporting said bar, and comprising a rearwardly extending hook portion having a tapered opening adapted to snugly engage shackle bolts of different diameters, and a portion extending rearwardly therefrom and provided with an arcuate slot substantially concentric to said shackle bolt engaging portion, and securing means engaging said slot and adapted to be secured to the frame, said slot permitting angular adjustment of said bracket about the shackle bolt.

8. In an automobile bumper for use upon the shackle bolt carrying frame ends of an automobile, a bumper bar comprising spaced upper and lower spring members and an intermediate rearwardly disposed reinforcing spring member, the ends of said upper and lower members being rearwardly of and superimposed upon the end of said reinforcing member, an attaching bracket therefor comprising a shackle bolt engaging portion, means for securing said bracket to the frame, and an integral bumper bar supporting portion having upper and lower flanges and an intermediate projection adapted to engage and position the ends of the upper and lower spring members, and a clamping plate secured to said portion to retain the ends of the spring members and having an intermediate recessed portion embracing the end of the reinforcing spring member.

Signed at Bridgeport, in the county of Fairfield, and State of Connecticut, this 30th day of Aug. A. D., 1923.

GEORGE F. KOLB.
JOHN H. LUCAS.

Witnesses:
C. M. Newman,
Carl F. Jensen.